United States Patent Office 3,398,195
Patented Aug. 20, 1968

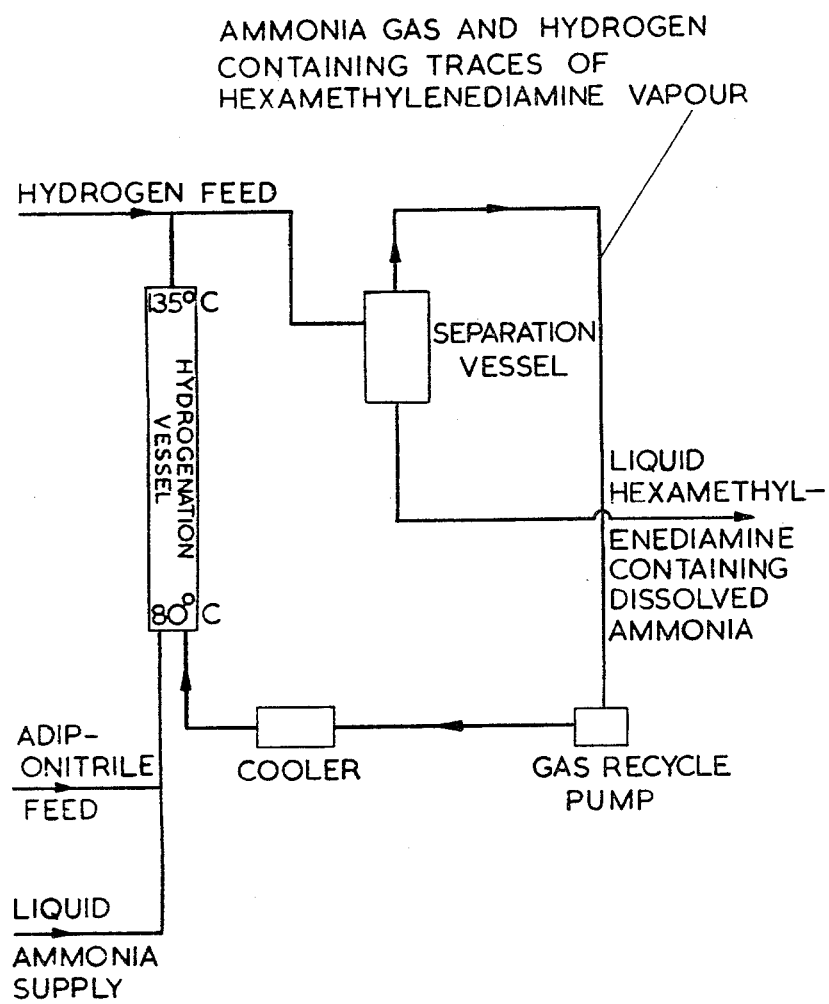

3,398,195
PROCESS FOR PRODUCING HEXAMETHYLENE-
DIAMINE
Richard Anthony Williams, Manchester, England, assignor to Imperial Chemical Industries Limited, London, England, a corporation of Great Britain
Filed Jan. 10, 1966, Ser. No. 519,576
Claims priority, application Great Britain, Jan. 11, 1965, 1,201/65
2 Claims. (Cl. 260—583)

This invention relates to the manufacture of hexamethylenediamine.

Hexamethylenediamine is made on the large scale as an intermediate for the manufacture of nylon usually by hydrogenation of adiponitrile. The hydrogenaton is conducted continuously under pressure at elevated temperature by mixing adiponitrile with a large excess of ammonia and hydrogen, and passing the mixture through a catalyst bed usually composed of copper, nickel or cobalt with or without a support.

It has now been found that the manufacture of hexamethylenediamine by the liquid phase hydrogenation of adiponitrile in presence of ammonia can be conducted more efficiently if the reaction mixture issuing from the hydrogenation zone is allowed to separate into gas and liquid phases whilst maintaining the temperature and pressure, and the gaseous mixture of hydrogen and ammonia which separates is then recirculated to the hydrogenation zone.

Thus according to the present invention I provide a process for the manufacture for hexamethylenediamine by the liquid phase hydrogenation of adiponitrile in presence of ammonia under pressure and at elevated temperature wherein the reaction mixture issuing from the hydrogenation zone is allowed to separate into a gas phase comprising hydrogen and ammonia and a liquid phase comprising hexamethylenediamine whilst maintaining the temperature and pressure and wherein separated hydrogen and ammonia are recirculated to the hydrogenation zone.

By operating in the above manner considerable heat economies can be effected.

The hydrogenation may be performed in known manner at temperatures of from about 85° to 150° C. and pressures of from 200 to 500 atmospheres. Preferably a cobalt hydrogenation catalyst is employed. Molecular ratios of ammonia to adiponitrile of from 20 mols to 50 mols of ammonia per mol of adiponitrile may be employed. Hydrogen is employed in excess.

The invention will be more readily understood by reference to the accompanying drawing which is a flow sheet representing a preferred embodiment of the invention. Referring to the flow sheet a liquid adiponitrile supply and a liquid ammonia supply are shown connected to a hydrogenation vessel having a top outlet to a separation vessel. The separation vessel has a bottom outlet for liquid hexamethylenediamine and a top outlet for separated ammonia gas and hydrogen which leads to a gas recycle pump. The pump is connected to a cooler from which the recycled ammonia gas and hydrogen is returned to the hydrogenation vessel. The heat removed in the cooler may be regulated to ensure the required temperature conditions in the hydrogenation vessel. In the form of the invention shown in flow diagram the liquid hexamethylene diamine phase is collected in the lower part of the separation vessel, and may be drawn off continuously or intermittently and passed to a pressure reduction vessel. The hexamethylenediamine phase may then be cooled, and dissolved ammonia separated from the hexamethylenediamine by distillation.

The invention is further illustrated by the following example.

Example

Excess hydrogen at 230 atmospheres pressure, 1200 lb./hour of adiponitrile and 2450 lb./hr. of liquid ammonia were injected continuously at 80° C. into a hydrogenation vessel containing a cobalt hydrogenation catalyst. Conditions were adjusted in the hydrogenator so that a maximum operating temperature at about 135° C. was reached. The products of reaction at 130–135° C. were collected in separation vessel where they were separated to give gas and liquid phases. The gas phase, containing hydrogen, ammonia and nitrogen was cooled to 30–40° C. and recycled to the hydrogenation vessel. The liquid phase was cooled and the ammonia distilled off after pressure reduction. The ammonia-free product contained 97.3% hexamethylenediamine and 2.7% other impurities.

I claim:
1. In a continuous process for the manufacture of hexamethylenediamine by passage of liquid adiponitrile, ammonia and hydrogen through a hydrogenation zone wherein the temperature is from 85° to 150° C. and the pressure is from 20 to 500 atmospheres to effect hydrogenation in liquid phase the improvement which comprises passing the mixture issuing from the said hydrogenation zone into a separation zone at the same temperature and pressure as the hydrogenation zone, allowing separation of the mixture into a gas phase comprising hydrogen and ammonia and a liquid phase comprising hexamethylenediamine and recirculating the hydrogen and ammonia to the hydrogenation zone.

2. Process according to claim 1 wherein hydrogen and ammonia from the separation zone are recycled to the hydrogenation zone through a gas recycle pump and a cooler.

References Cited
UNITED STATES PATENTS
3,193,472    7/1965    Isacks _____ 260—583

CHARLES B. PARKER, Primary Examiner.
P. C. IVES, Assistant Examiner.